United States Patent [19]

Berry, Jr.

[11] Patent Number: 5,662,302

[45] Date of Patent: Sep. 2, 1997

[54] LICENSE PLATE HANGER

[76] Inventor: George W. Berry, Jr., 305 W. Pine St., West, Tex. 76691-1432

[21] Appl. No.: 345,737

[22] Filed: Nov. 22, 1994

[51] Int. Cl.$^6$ ............................................. A47H 1/10
[52] U.S. Cl. ................................................ 248/317
[58] Field of Search .................... 248/317, 60, 549, 248/548, 589; 40/200, 211; 280/851

[56] References Cited

U.S. PATENT DOCUMENTS

| | | |
|---|---|---|
| 1,083,728 | 1/1914 | Clement. |
| 1,125,089 | 1/1915 | Godley. |
| 1,431,639 | 10/1922 | Ellithorpe. |
| 1,834,690 | 12/1931 | Dolan ............................................. 40/200 |
| 2,122,375 | 6/1938 | Kovac ............................................ 248/317 |
| 2,591,196 | 4/1952 | Post. |
| 2,744,706 | 5/1956 | Gerdy ....................................... 248/317 X |
| 3,393,891 | 7/1968 | Murray ...................................... 40/200 X |
| 4,465,252 | 8/1984 | Donovan .................................. 248/589 X |
| 4,796,841 | 1/1989 | Baker ........................................... 248/60 |

FOREIGN PATENT DOCUMENTS 169404  9/1921  United Kingdom ..................... 40/200

*Primary Examiner*—Leslie A. Braun
*Assistant Examiner*—Sarah Purol
*Attorney, Agent, or Firm*—Diller, Ramik & Wight, PC

[57] ABSTRACT

A license plate hanger is provided particularly for suspending a license plate from the rear frame of an associated vehicle. The license plate hanger is formed of a one-piece, nonmetallic, reinforced, multi-ply, resilient, substantially flat and substantially homogenous plate-like member defined by an upper hanger portion and a lower license plate attaching portion with a reduced neck portion therebetween. The material of the license plate hanger permits the neck portion to be deflected over and over again without permanent deformation and/or breakage and without damage to property or individuals. Preferably, the license plate attaching portion has a peripheral edge which projects beyond a peripheral edge of the license plate to thereby prevent damage to persons and property by the known sharp edge of a metallic license plate.

23 Claims, 2 Drawing Sheets

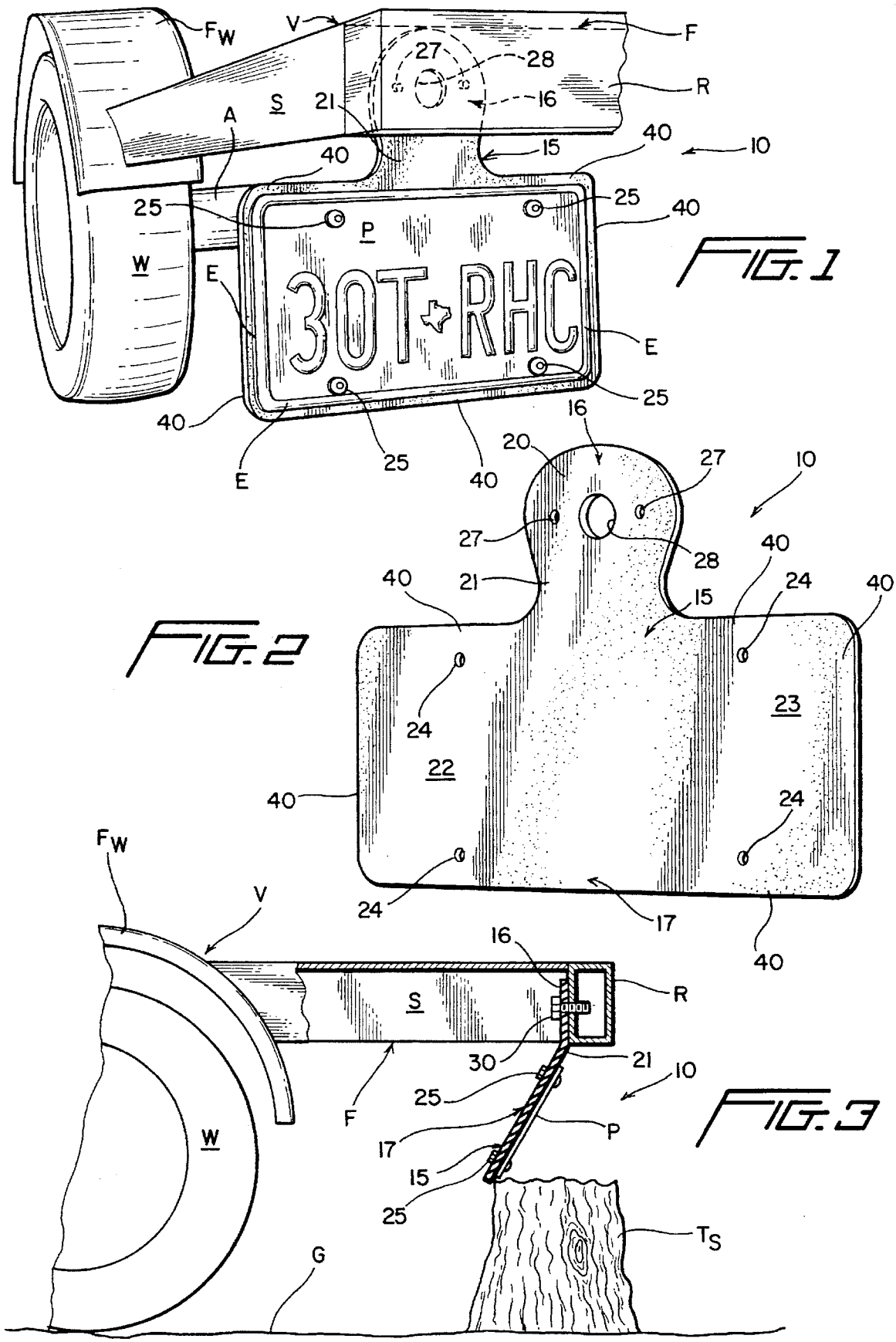

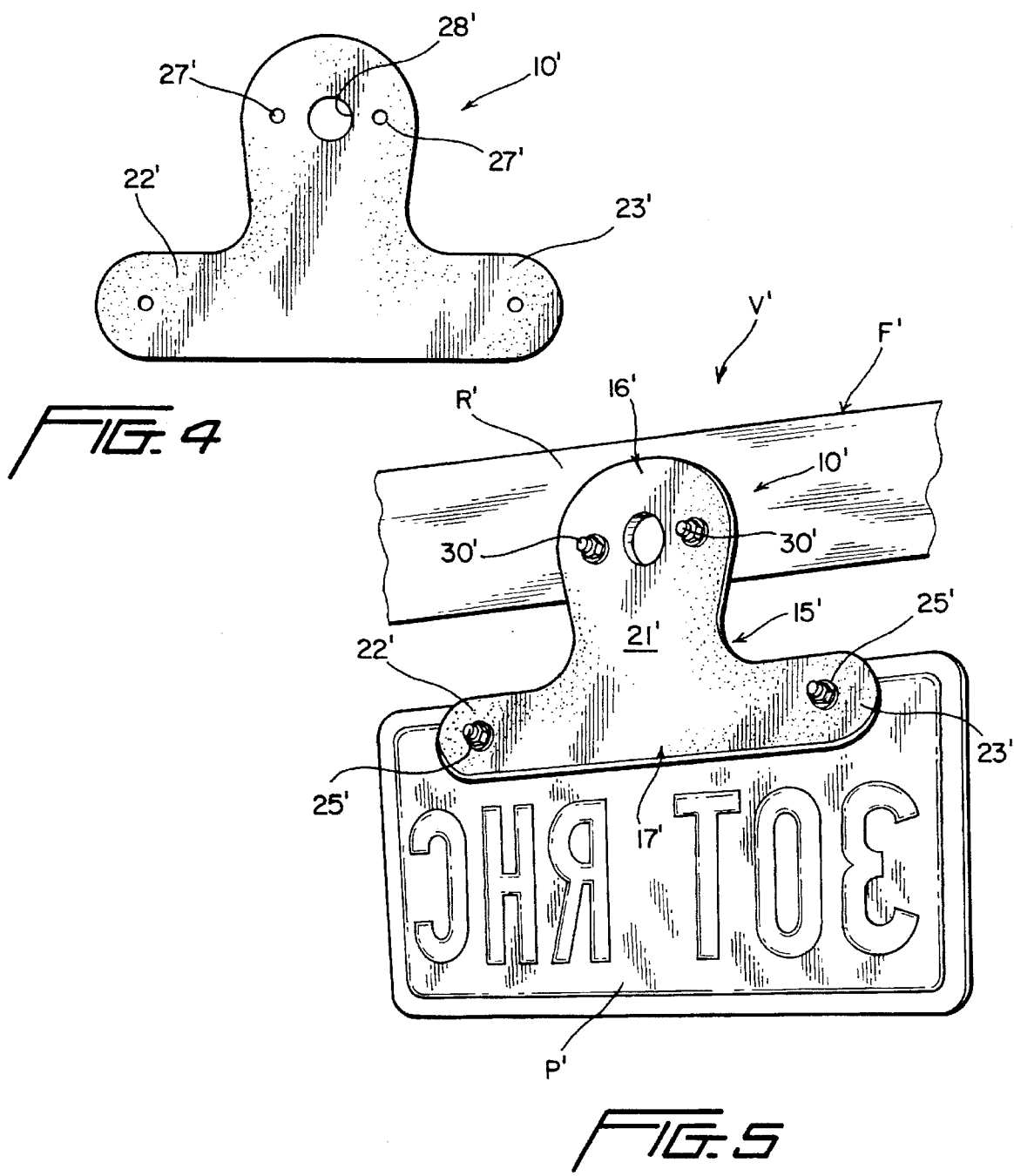

LICENSE PLATE HANGER

BACKGROUND OF THE INVENTION

The present invention is directed to a license plate hanger particularly adapted for suspending a license plate from the rear frame of an associated vehicle, such as a trailer.

Conventional license plate hangers are typically of the type disclosed in the patents to Ellithorpe (U.S. Pat. No. 1,431,639) and Goley (U.S. Pat. No. 1,125,089). The former discloses a license plate hanger of a triangular configuration having an upper apex portion provided with an aperture through which can pass the socket of a vehicle taillight, while opposite lower arms of the license plate hanger are apertured to receive fasteners. The patent is silent as to the material from which the license plate hanger is constructed, but it is most likely resilient (permanently deformed) metallic metal which when bent will remained bent or if sufficiently rigid will simply break. If bent and re-bent a number of times, obviously, the license plate hanger will also break. If associated with a trailer, the license plate hanger of Ellithorpe is subject to abuse and damage because such trailers are typically backed with little regard to damage, be it damage self-afflicted upon the trailer and its components or damage caused the environment, such as backing into bushes, fences, trees, parking abutments, etc. License plates hangers for trailers are also mounted quite low on the frame, generally hanging from an associated back-up light, and are susceptible to damage not only while be backed-up, but also during travel over bumpy roads. Thus, license plate hangers of the type disclosed in these patents are susceptible to both being damaged and causing damage, both personal and property.

Others have recognized the undesired nature of license plate hangers which are constructed from rigid or typically resilient (permanently deformed) metallic material, and the problems and others just mentioned have been solved in a variety of ways. For example, a hinged license plate hanger is disclosed in the patent to Post (U.S. Pat. No. 2,591,196) while a multi-strap license plate hanger is disclosed in the patent to Clement (U.S. Pat. No. 1,083,728). However, neither of these patents nor those earlier mentioned are susceptible to abuse or misuse absent being damaged or causing personal or property damage through misuse and/or abuse.

SUMMARY OF THE INVENTION

A novel license plate hanger which is particularly adapted for suspending a license plate from the rear frame of an associated vehicle, specifically a trailer, is formed from a one-piece, non-metallic, reinforced, multi-ply, resilient, substantially flat and substantially homogeneous plate-like member defined by an upper hanger portion and a lower license plate attaching portion. The lower license plate attaching portion is defined by a pair of oppositely projecting arms between and above which is disposed the upper hanger portion. Holes in each arm and in the upper hanger portion serve to respectively attach a license plate thereto and attach the license plate hanger to a motor vehicle. It is because the license plate hanger is constructed from the material described that it can be abused in virtually any fashion, and no matter how bent or re-bent will rebound to its original plate-like planar configuration without damage to itself, and/or property be it real or personal or damage to an individual.

The license plate hanger of the present invention is defined by a circular head portion merging into a reduced neck portion which in turn merges with a pair of oppositely projecting arms generally medially thereof, and preferably the arms have a predetermined size and peripheral configuration larger than that of a license plate attached thereto. Thus, the peripheral edge of an associated license plate is inboard of a peripheral edge of the lower license plate attaching portion/arms and the license plate is thereby protected. More importantly, the edge of a metallic license plate, which is known to be relatively sharp, cannot cause damage to person or property because a peripheral edge of the arms projects beyond the sharp edge of the metallic license plate and serves as an annular or peripheral protecting border.

The arms of the license plate hanger can also be relatively narrow, and though this embodiment of the invention does not afford the same degree of protection just stated, the license plate hanger will still serve the primary function of repeated abuse through inadvertent or accidental bending.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a fragmentary perspective view of the rear end of a vehicle, such as a trailer, and illustrates a license plate hanger of the present invention secured thereto and in turn carrying a license plate.

FIG. 2 is a perrspective view of the license plate hanger of the present invention, and illustrates an upper hanger portion defined by a generally circular head portion merging into a reduced neck portion which in turn merges with a pair of oppositely directed arms.

FIG. 3 is a fragmentary side elevational view of the trailer of FIG. 1, and illustrates the manner in which the license plate hanger will momentarily deflect absent permanent deformation or rupture when inadvertently bent upon the manipulation of the trailer under normal operative conditions.

FIG. 4 is a front elevational view of another license plate hanger of the present invention, and illustrates a pair of arms narrower than those of the license plate hanger of FIG. 2.

FIG. 5 is a fragmentary perspective view of a portion of a frame of a trailer, and illustrates the license plate hanger of FIG. 4 fastened thereto and in turn having fastened to a pair of arms thereof a conventional metallic license plate.

DESCRIPTION OF THE PREFERRED EMBODIMENTS

A novel license plate hanger constructed in accordance with this invention is generally designated by the reference numeral 10 in FIGS. 1 through 3 of the drawings.

The license plate hanger 10 is shown in FIGS. 1 and 3 attached to an associated vehicle V which, for example, might be a typical two-wheel trailer of which but a single wheel W is illustrated in associated with an axle A carried by a frame F which carries a conventional wheel fender Fw. The frame F includes a typical side rail S and a rear rail R suitable welded to each other, and it is to the rear rail or support R that the license plate hanger 10 is typically fastened. Typically when the license plate hanger 10 or any conventional license plate hanger is suspended from the rear rail or support R of the vehicle V, it is susceptible to be damaged and/or cause damage, because it projects quite a distance below the frame F and is close to the ground G (FIG. 3) upon which the trailer V might travel. For example, when the trailer V is backed rearward along the ground G (FIG. 3), obstacles, such as tree stumps Ts, might strike and temporarily deflect the license plate hanger 10 while other conventional metallic license plate hangers would be permanently bent and/or broken. The characteristic of ability of the license plate hanger 10 to rebound continuously from an indeterminate number of bends is due to its construction as a one-piece, nonmetallic, reinforced, multi-ply, resilient (nondeformable) substantially flat and substantially homogeneous plate-like member 15 (FIG. 2).

The plate-like member 15 is defined by an upper hanger portion 16 and a lower license plate attaching portion 17.

The upper hanger portion 16 is defined by a generally circular head portion 20 merging into a reduced neck portion 21 which in turn merges with a pair of oppositely projecting arms 22, 23 of the license plate attaching portion 15 generally medially of opposite ends (unnumbered) of the arms 22, 23.

Means 24 in the form of holes or openings are formed in the arms 22, 23 for securing a license plate P (FIG. 1) thereto by means of appropriate conventional fasteners 25 in the form of bolts and/or nuts 25. The circular neck portion 20 also includes means 27 in the form of a pair of spaced holes and means 28 in the form of a relatively large or circular hole 28 for securing the license plate hanger 10 to the frame F of the vehicle V which in FIG. 3 is shown being accomplished by conventional bolts 30. Alternatively, the license plate hanger 10 can be assembled to a trailer V by slipping the larger circular opening 28 over a conventional stop-light fitting and in such case, the bolts 30 need not be utilized.

The license plate P is of a particular predetermined peripheral configuration, as defined by a peripheral edge E thereof, and the overall size and shape is slightly less than the predetermined peripheral configuration of the license plate attaching portion 17, as defined by a peripheral edge 40 of the latter. Therefore, the peripheral edge 40 projects beyond the peripheral edge E of the license plate P and prevents the edge E from causing damage to property or persons, particularly the latter due to the known relatively sharp nature of the raw sharp edge E of metallic license plates P.

From the foregoing, at any time that the trailer V is driven in any fashion which causes the license plate hanger 10 to bend or deflect, as shown graphically in FIG. 3, such bending or deflection is momentary and temporary, and the very nature of the construction of the plate-like member 15 causes the same to rebound to its original planar configuration once the license plate hanger 10 moves beyond the obstacle which it encounters, be it a tree stump Ts or the like.

As was noted earlier, the inherent resilience or elasticity of the license plate hanger resides in the fact that it is constructed from nonmetallic resilient material which is preferably single-ply interwoven PVC or multi-ply heavy duty/transmission belting respectively identified by the belt designations PV-120 and 415-B of D. E. Shipp Belting Co. of 123 South Industrial, P.O. Box 20035, Waco, Tex. 76702. Alternative materials from which the plate-member 15 can be constructed is the multi-ply materials designated as Food King 1W and 415N Special of Sparks Belting Co. All of the aforementioned materials share the desirable qualities of resilience or elasticity and are resistant to water, weather, rust, corrosion, most chemicals, oils, solvents and ozone. The latter material plus the reduced neck portion 21 effects temporary localized bending absent deformation in the area of the reduced neck 21 and subsequent return thereof to the planar configuration of the plate-like member 15. While the license plate hanger 10 is not damaged when obstacles are encountered, as shown in FIG. 3, it is to be understood that due to the resilient nature of the license plate hanger 10, objects which might otherwise be damaged when struck by a rigid license plate hanger will not be damaged by the license plate hanger 10 since it will simply deflect upon encountering more fragile obstacles than the tree stump Ts. Thus, the construction Of the license plate hanger 10 prevents damage to itself, damage to other personal property and damage to individuals.

Reference is now made to FIGS. 4 and 5 of the drawings which illustrate another license plate hanger 10' constructed from the same materials as that heretofore described relative to the license plate hanger 10. All elements of the license plate hanger 10 which are common to the license plate hanger 10' are not described but are designated by identical though primed reference numerals. However, the singular and major difference between the license plate hangers 10 and 10' is the fact that oppositely directed arms 22', 23' of the license plate hanger 10' are relatively narrow and are also shorter than the arms 22, 23 of the license plate hanger 10. Thus, when the license plate hanger 10' is used to hang a metallic license plate P' from a vehicle V', as shown in FIG. 5, the sharp edge E' of the license plate P' is exposed. Therefore, the protection afforded by the peripheral edge 40 of the license plate hanger 10 is not afforded by the license plate hanger 10', but otherwise the construction and function of the license plate hangers 10, 10' are identical.

Although a preferred embodiment of the invention has been specifically illustrated and described herein, it is to be understood that minor variations may be made in the apparatus without departing from the spirit and scope of the invention, as defined the appended claims.

I claim:

1. A license plate hanger particularly adapted for suspending a license plate from the rear frame of an associated vehicle comprising one-piece nonmetallic, reinforced, multi-ply, resilient, substantially flat and substantially homogeneous plate-like member; said plate-like member being defined by an upper hanger portion and a lower license plate attaching portion, said lower license plate attaching portion being defined by a pair of oppositely projecting arms between and above which is disposed said upper hanger portion, means in each arm for securing a license plate fastener thereto, and means in said upper hanger portion for securing said upper hanger portion to an associated vehicle whereby said license plate hanger is adapted to permit said license plate hanger to rebound to an original position after said license plate hanger has been bent.

2. The license plate hanger as defined in claim 1 wherein the upper hanger portion is defined by a generally circular head portion merging into a reduced neck portion which in merges with said arms generally medially of opposite ends of said arms.

3. A license plate hanger particularly adapted for suspending a license plate from the rear frame of an associated vehicle comprising a one-piece, nonmetallic, reinforced, multi-ply, resilient, substantially flat and substantially homogeneous plate-like member; said plate-like member being defined by an upper hanger portion and a lower license plate attaching portion, said lower license plate attaching portion being defined by a pair of oppositely projecting arms between and above which is disposed said upper hanger portion, means in each arm for securing a license plate fastener thereto, means in said upper hanger portion for securing said upper hanger portion to an associated vehicle whereby said license plate hanger is adapted to permit said license plate hanger to rebound to an original position after said license plate hanger has been bent, a license plate, a license plate fastener for securing said license plate to each arm, said license plate having a predetermined peripheral configuration defined by a peripheral edge thereof, and said lower license plate attaching portion having a predetermined peripheral configuration defined by a peripheral edge thereof which is larger than said license plate peripheral configuration whereby said license plate attaching portion peripheral edge projects beyond said license plate peripheral edge to thereby prevent damage to or by said license plate.

4. The license plate hanger as defined in claim 1 wherein said license plate fastener securing means is a hole in each arm.

5. The license plate hanger as defined in claim 1 wherein said upper hanger portion securing means is a hole.

6. The license plate hanger as defined in claim 1 wherein said upper hanger portion securing means is a relatively large centrally located hole.

7. The license plate hanger as defined in claim 1 wherein said upper hanger portion securing means are a pair of spaced holes.

8. The license plate hanger as defined in claim 1 wherein said upper hanger portion securing means are a pair of spaced holes and a relatively large hole located generally medially of said pair of spaced holes.

9. A license plate hanger particularly adapted for suspending a license plate from the rear frame of an associated vehicle comprising a one-piece, nonmetallic, reinforced, multi-ply, resilient, substantially flat and substantially homogeneous plate-like member; said plate-like member being defined an upper hanger portion and a lower license plate attaching portion, said lower license plate attaching portion being defined by a pair of oppositely projecting arms between and above which is disposed said upper hanger portion, means in each arm for securing a license plate fastener thereto, means in said upper hanger portion for securing said upper hanger portion to an associated vehicle whereby said license plate hanger is adapted to permit said license plate hanger to rebound to an original position after said license plate hanger has been bent, the upper hanger portion being defined by a generally circular head portion merging into a reduced neck portion with in turn merges with said arm generally medially of opposite ends of said arms, a license plate, a license plate fastener for securing said license plate to each arm, said license plate having a predetermined peripheral configuration defined by a peripheral edge thereof, and said lower license plate attaching portion having a predetermined peripheral configuration defined by a peripheral edge thereof which is larger than said license plate peripheral configuration whereby said license plate attaching portion peripheral edge projects beyond said license plate peripheral edge to thereby prevent damage to or by said license plate.

10. The license plate hanger as defined in claim 2 wherein said upper hanger portion securing means is a relatively large centrally located hole.

11. The license plate hanger as defined in claim 2 wherein said upper hanger portion securing means are a pair of spaced holes and a relatively large hole located generally medially of said pair of spaced holes.

12. The license plate hanger as defined in claim 3 wherein said license plate fastener securing means is a hole in each arm.

13. The license plate hanger as defined in claim 3 wherein said upper hanger portion securing means is a hole.

14. The license plate hanger as defined in claim 3 wherein said upper hanger portion securing means is a relatively large centrally located hole.

15. The license plate hanger as defined in claim 3 wherein said upper hanger portion securing means are a pair of spaced holes.

16. The license plate hanger as defined in claim 3 wherein said upper hanger portion securing means are a pair of spaced holes and a relatively large hole located generally medially of said pair of spaced holes.

17. The license plate hanger as defined in claim 9 wherein said license plate fastener securing means is a hole in each arm.

18. The license plate hanger as defined in claim 9 wherein said upper hanger portion securing means is a relatively large centrally located hole.

19. The license plate hanger as defined in claim 9 wherein said upper hanger portion securing means are a pair of spaced holes.

20. The license plate hanger as defined in claim 9 wherein said upper hanger portion securing means are a pair of spaced holes and a relatively large hole located generally medially of said pair of spaced holes.

21. A license plate hanger particularly adapted for suspending a license plate from the rear frame of an associated vehicle comprising a one-piece, nonmetallic, reinforced, multi-ply, resilient, substantially flat and substantially homogeneous plate-like member; said plate like member being defined by an upper hanger portion and a lower license plate attaching portion, said lower license plate attaching portion being defined by a pair of oppositely projecting arms between and above which is disposed said upper hanger portion, means in each arm for securing a license plate fastener thereto, means in said upper hanger portion for securing said upper hanger portion to an associated vehicle whereby said license plate hanger is adapted to permit said license plate hanger to rebound to an original position after said license plate hanger has been bent, a vehicle, and vehicle fastener means associated with said upper hanger portion securing means for fastening said upper hanger portion to said vehicle.

22. A license plate hanger particularly adapted for suspending a license plate from the rear frame of an associated vehicle comprising a one-piece, nonmetallic, reinforced, multi-ply, resilient, substantially flat and substantially homogeneous plate-like member said plate-like member being defined by an upper hanger portion and a lower license plate attaching portion, said lower license plate attaching portion being defined by a pair of oppositely projecting arms between and above which is disposed said upper hanger portion, means in each arm for securing a license plate fastener thereto, means in said upper hanger portion for securing said upper hanger portion to an associated vehicle whereby said license plate hanger is adapted to permit said license plate hanger to rebound to an original position after said license hanger has been bent, a license plate, a license plate fastener for securing said license plate to each arm, said license plate having a predetermined peripheral configuration defined by a peripheral edge thereof, said lower license plate attaching portion having a predetermined peripheral configuration defined by a peripheral edge thereof which is larger than said license plate peripheral configuration whereby said license plate attaching portion peripheral edge projects beyond said license plate peripheral edge to thereby prevent damage to or by said license plate, a vehicle, and vehicle fastener means associated with said upper hanger portion securing means for fastening said upper hanger portion to said vehicle.

23. A license plate hanger particularly adapted for suspending a license plate from the rear frame of an associated vehicle comprising a one-piece, nonmetallic, reinforced, multi-ply, resilient, substantially flat and substantially homogeneous plate-like member; said plate-like member being defined by an upper hanger portion and a lower license plate attaching portion, said lower license plate attaching portion being defined by a pair of oppositely projecting arms between and above which is disposed said upper hanger portion, means in each arm for securing a license plate fastener thereto, means in said upper hanger portion for securing said upper hanger portion to an associated vehicle whereby said license plate hanger is adapted to permit said license plate hanger to rebound to an original position after said license plate hanger has been bent, the upper hanger portion being defined by a generally circular head portion merging into a reduced neck portion which in turn merges with said arms generally medially of opposite ends of said arms, a license plate, a license plate fastener for securing said license plate to each arm, said license plate having a predetermined peripheral configuration defined by a peripheral edge thereof, said lower license plate attaching portion having a predetermined peripheral configuration defined by a peripheral edge thereof which is larger than said license plate peripheral configuration whereby said license plate attaching portion peripheral edge projects beyond said license plate peripheral edge to thereby prevent damage to or by said license plate, a vehicle, and vehicle fastener means associated with said upper hanger portion securing means for fastening said upper hanger portion to said vehicle.

* * * * *